(12) United States Patent
Hung (10) Patent No.: US 7,584,524 B2
(45) Date of Patent: Sep. 8, 2009

(54) HINGE FOR A NOTEBOOK EXTENSION PAD

(75) Inventor: Shun-Yu Hung, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 133 days.

(21) Appl. No.: 11/878,489

(22) Filed: Jul. 25, 2007

(65) Prior Publication Data

US 2009/0025182 A1    Jan. 29, 2009

(51) Int. Cl.
E05C 17/64    (2006.01)
(52) U.S. Cl. .............................. 16/337; 16/319; 16/325
(58) Field of Classification Search ............... 16/255, 16/257, 258, 265, 284, 297, 300, 317, 319, 16/324, 325, 337, 341, 344, 352, 355, 365, 16/374, 377, 299; 455/575.3; 379/433.13; 361/680–683; 312/233.1–233.6; 349/58, 349/65
See application file for complete search history.

(56) References Cited

U.S. PATENT DOCUMENTS

| | | | | |
|---|---|---|---|---|
| 5,334,354 A * | 8/1994 | Johnston et al. | ............. | 422/104 |
| 5,940,936 A * | 8/1999 | Lu | ............... | 16/337 |
| 6,125,507 A * | 10/2000 | Katoh | .......... | 16/329 |
| 6,430,777 B1 * | 8/2002 | Lu | ............... | 16/340 |
| 6,581,893 B1 * | 6/2003 | Lu | ........... | 248/291.1 |
| 6,618,903 B2 * | 9/2003 | Kim | ............. | 16/337 |
| 6,772,481 B2 * | 8/2004 | Oshima et al. | ........... | 16/330 |
| 6,813,813 B2 * | 11/2004 | Lu et al. | ............. | 16/342 |
| 7,013,532 B2 * | 3/2006 | Lu et al. | ............. | 16/337 |
| 7,287,302 B2 * | 10/2007 | Park et al. | ............. | 16/330 |
| 7,414,832 B2 * | 8/2008 | Wang et al. | ............. | 361/681 |
| 7,414,762 B2 * | 9/2008 | Lu et al. | ............. | 16/328 |
| 7,430,786 B1 * | 10/2008 | Jian | ............. | 16/330 |
| 2003/0097732 A1 * | 5/2003 | Kim | ............. | 16/337 |
| 2003/0122046 A1 * | 7/2003 | Huong | ........... | 248/291.1 |
| 2005/0091796 A1 * | 5/2005 | Lu et al. | ............. | 16/337 |
| 2005/0204509 A1 * | 9/2005 | Lin et al. | ............. | 16/342 |
| 2008/0196204 A1 * | 8/2008 | Lin et al. | ............. | 16/341 |

* cited by examiner

*Primary Examiner*—Victor Batson
*Assistant Examiner*—Emily M Morgan
(74) *Attorney, Agent, or Firm*—Bacon & Thomas, PLLC (57) ABSTRACT

A hinge for a notebook extension pad is mounted in an expansion pad of a notebook and has a pivoting assembly, a positioning disk, a limiting stationary leaf, a limiting disk, a pressing assembly and a locking assembly. The expansion pad has a mounting segment and a pad. The pivoting assembly is mounted securely on the pad and has a shaft. The positioning disk is mounted around the shaft. The limiting stationary leaf is adjacent to the positioning disk, is mounted rotatably around the shaft and connects with the mounting segment. The limiting disk limits movement of the pad relative to the mounting segment. The pressing assembly provides friction against movement to the hinge. The locking assembly is mounted around the shaft and selectively holds the pad at an angle allowing the pad to be used to display the notebook for presentations or achieving a comfortable typing angle.

7 Claims, 9 Drawing Sheets

HINGE FOR A NOTEBOOK EXTENSION PAD

BACKGROUND OF THE INVENTION

1. Field of the Invention

The present invention relates to a hinge, and more particularly to a hinge mounting in a notebook extension pad to provide the extension pad a rotating function for adjusting the operating angle of the notebook.

2. Description of the Prior Arts

As notebooks have become an essential business tool and are routinely used, carried products are designed to make the notebook more convenient to use. The extension pad allows the notebook to stay thin and small whilst giving a user space to add their desired functionality, such as an extra hard disk, fan or the like and is mounted below the notebook to raise an operating height for the user. However, the extension pad can only be parallel to the surface it is placed on so the user cannot adjust an angle to operate the notebook. Also, when giving small presentations the notebook cannot be displayed well.

To overcome the shortcomings, the present invention provides a hinge for a notebook extension pad to mitigate or obviate the aforementioned problems.

SUMMARY OF THE INVENTION

The primary objective of the present invention is to provide a hinge mounting in a notebook extension pad to provide the extension pad a rotating function for adjusting the operating angle of the notebook.

A hinge for a notebook extension pad is mounted on an expansion pad and a notebook and has a pivoting assembly, a positioning disk, a limiting stationary leaf, a limiting disk, a pressing assembly and a locking assembly. The expansion pad has a mounting segment and a pad. The pivoting assembly is mounted securely in the pad and has a shaft. The positioning disk is mounted securely around the shaft. The limiting stationary leaf is adjacent to the positioning disk, is mounted rotatably around the shaft and connects securely with the mounting segment. The limiting disk is adjacent to the limiting stationary leaf to limit movement of the pad relative to the mounting segment. The pressing assembly presses against the limiting disk to provide friction against movement to the hinge. The locking assembly is mounted around the shaft and selectively holds the pad at a designated angle. Therefore, the pad can be used to display the notebook whilst giving presentations or achieve a comfortable typing angle.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1, 2, 3, and 8, a hinge for a notebook extension pad in accordance with the present invention is applied in an extension pad (70) and comprises a pivoting assembly (10), a positioning disk (20), a limiting stationary leaf (30), a limiting disk (40), a pressing assembly (50) and a locking assembly (60).

Figure 3:
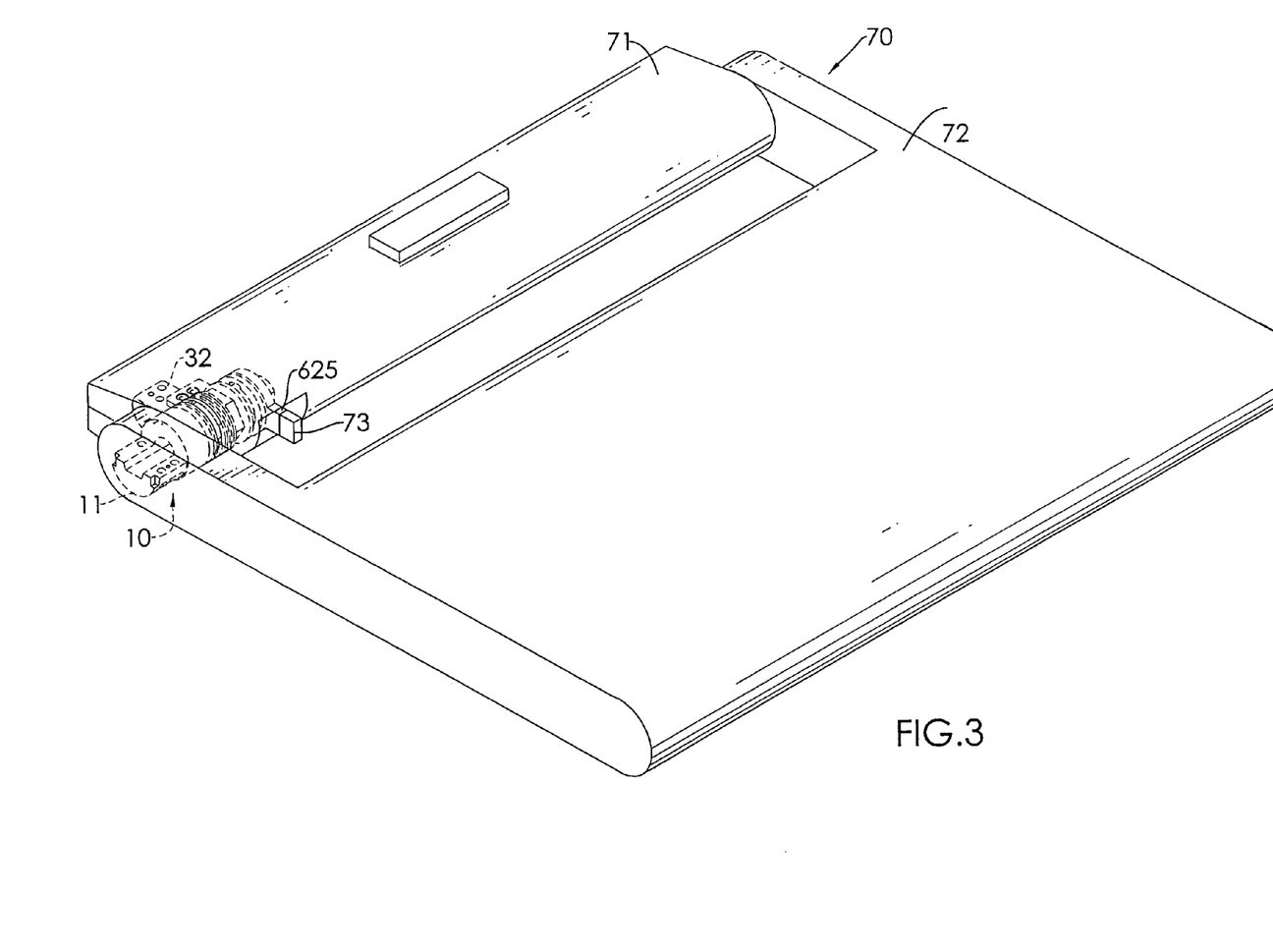
FIG. 3 is a perspective view of the hinge in FIG. 1 mounted in an expansion pad.
Figure 8:
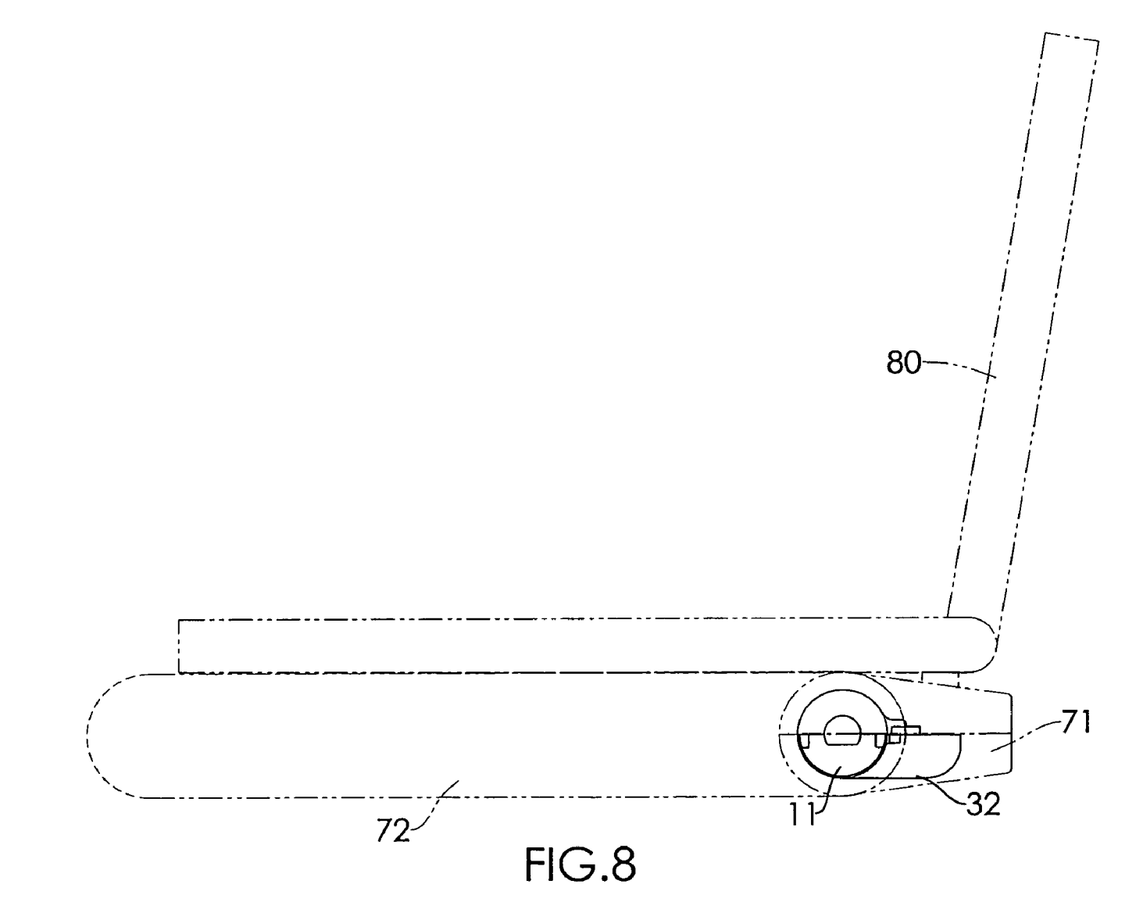
FIG. 8 is an operational side view of the hinge in FIG. 1 applied in an extension pad mounted below a notebook.

The extension pad (70) is designed for a notebook (80), is mounted below the notebook and has a mounting segment (71), a pad (72) and a lock (73). The mounting segment (71) is mounted on the notebook (80) and has two ends and a front. The pad (72) is a flat panel corresponds to the notebook (80) to elevate the notebook (80), is mounted pivotally to the mounting segment (71). The lock (73) is mounted slidably in the mounting segment (71) and extends out of the front of the mounting segment (71).

Figure 4:
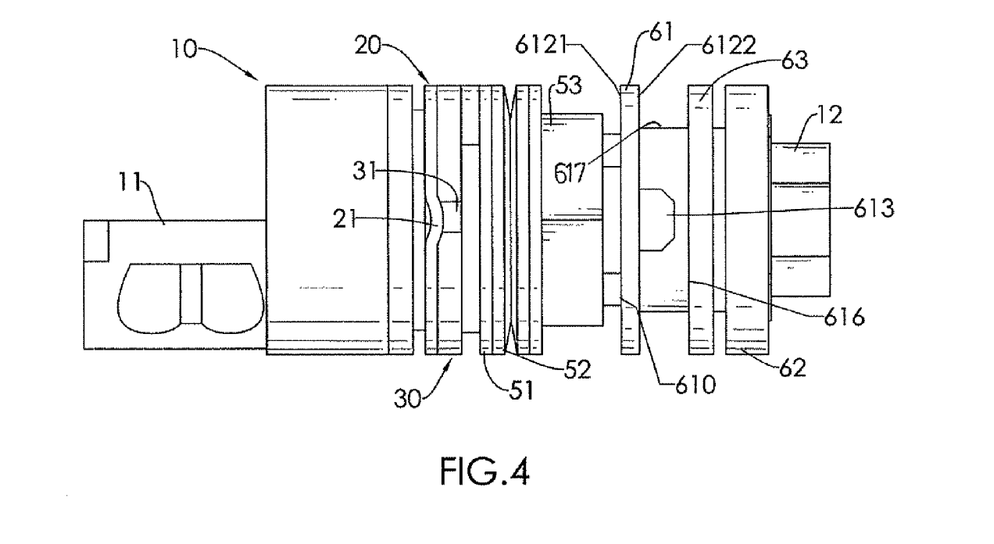
FIG. 4 is a front view of the hinge in FIG. 1.

With further reference to FIG. 4, the pivoting assembly (10) is mounted in the extension pad (70) and has an inner end (102), an outer end (101), a mounting leaf (11) and a shaft (12).

The mounting leaf (11) is formed on and extends from the outer end (101) of the pivoting assembly (10) and is mounted securely in the pad (72).

The shaft (12) is keyed, is formed on and extends from the inner end (102) of the pivoting assembly (10) and has a distal end, and may have a threaded segment (121).

Figure 1:
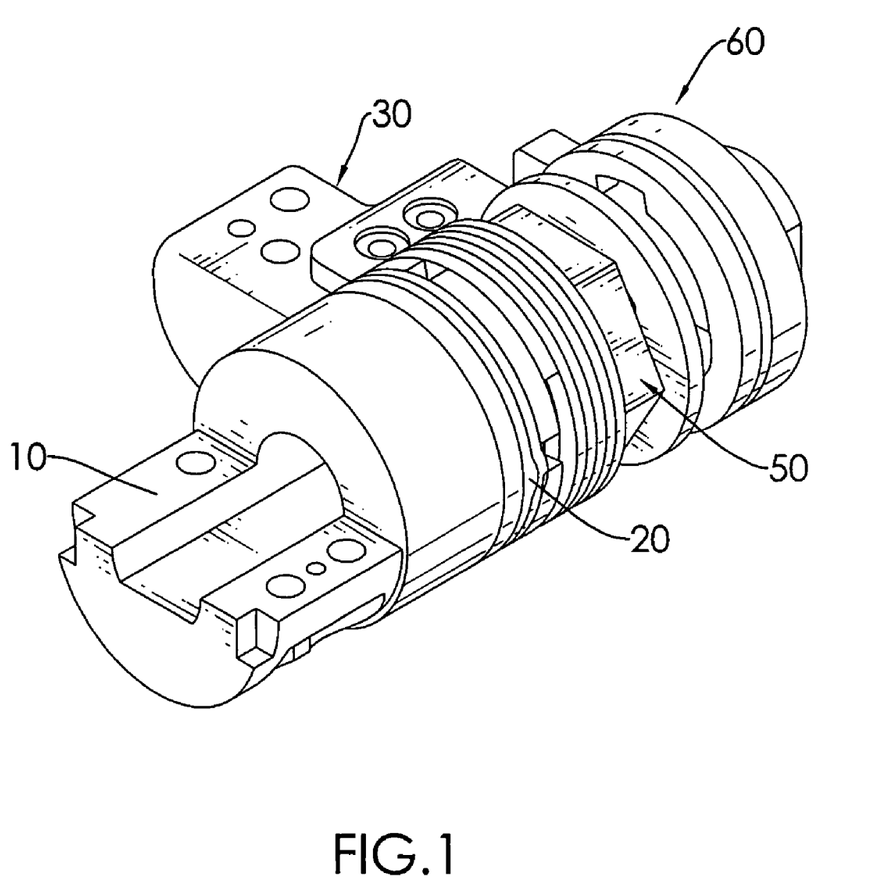
FIG. 1 is a perspective view of a hinge for a notebook extension pad in accordance with the present invention.
Figure 2:
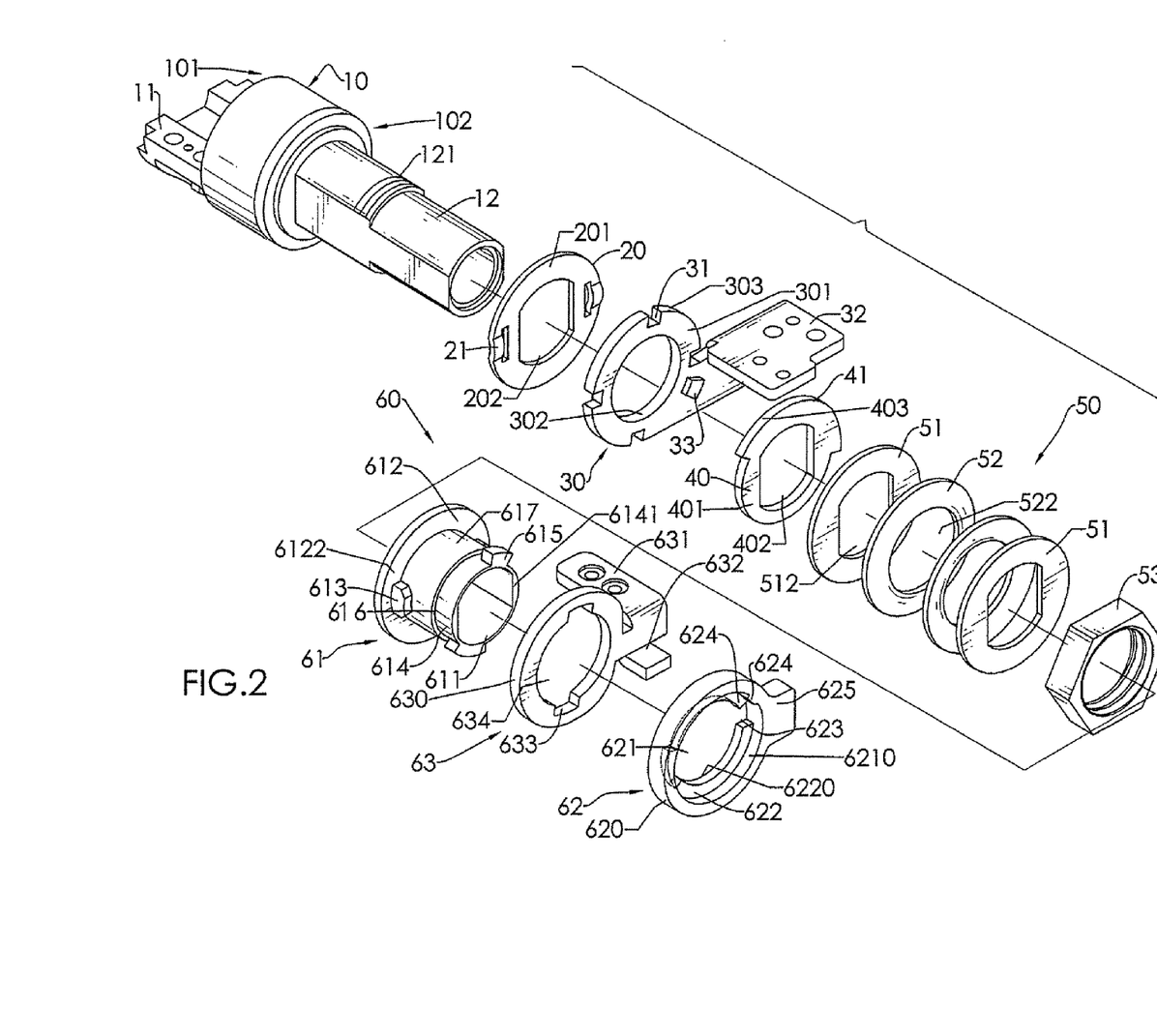
FIG. 2 is an exploded perspective view of the hinge in FIG. 1.

The positioning disk (20) is mounted coaxially and securely around the shaft (12) and has an inner surface (201), a keyed hole (202) and at least one positioning protrusion (21). The keyed hole (202) is formed through the positioning disk (20) and corresponds to and engages the shaft (12). The positioning protrusion (21) is formed on and protrudes from the inner surface (201) of the positioning disk (20). Each positioning protrusion (21) may be convex.

The limiting stationary leaf (30) is rotatably mounted coaxially around the shaft (12), is adjacent to the inner surface of the positioning disk (20) and has an edge (303), an inner surface (301), a pivoting hole (302), multiple detents (31), a mounting protrusion (32) and a boss (33).

The pivoting hole (302) is round, is formed coaxially through the limiting stationary leaf (30) and is mounted around the shaft (12).

The detents (31) are formed separately in the edge (303) of the limiting stationary leaf (30) and correspond respectively to and selectively engage the positioning protrusion (21) to hold the pad (72) in various positions when pivoting relative to the mounting segment (71).

The mounting protrusion (32) is formed on and extends from the edge (303) of the limiting stationary leaf (30) and is mounted securely on the mounting segment (71) to allow the pad (72) to pivot relative to the mounting segment (71).

The boss (33) is formed on and protrudes from the inner surface (301) of the limiting stationary leaf (30).

Figure 5:
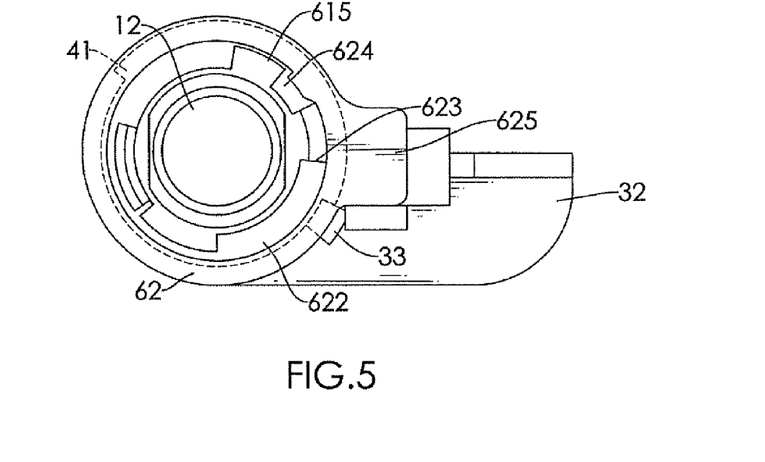
FIG. 5 is a side view of the hinge in FIG. 1.
Figure 9:
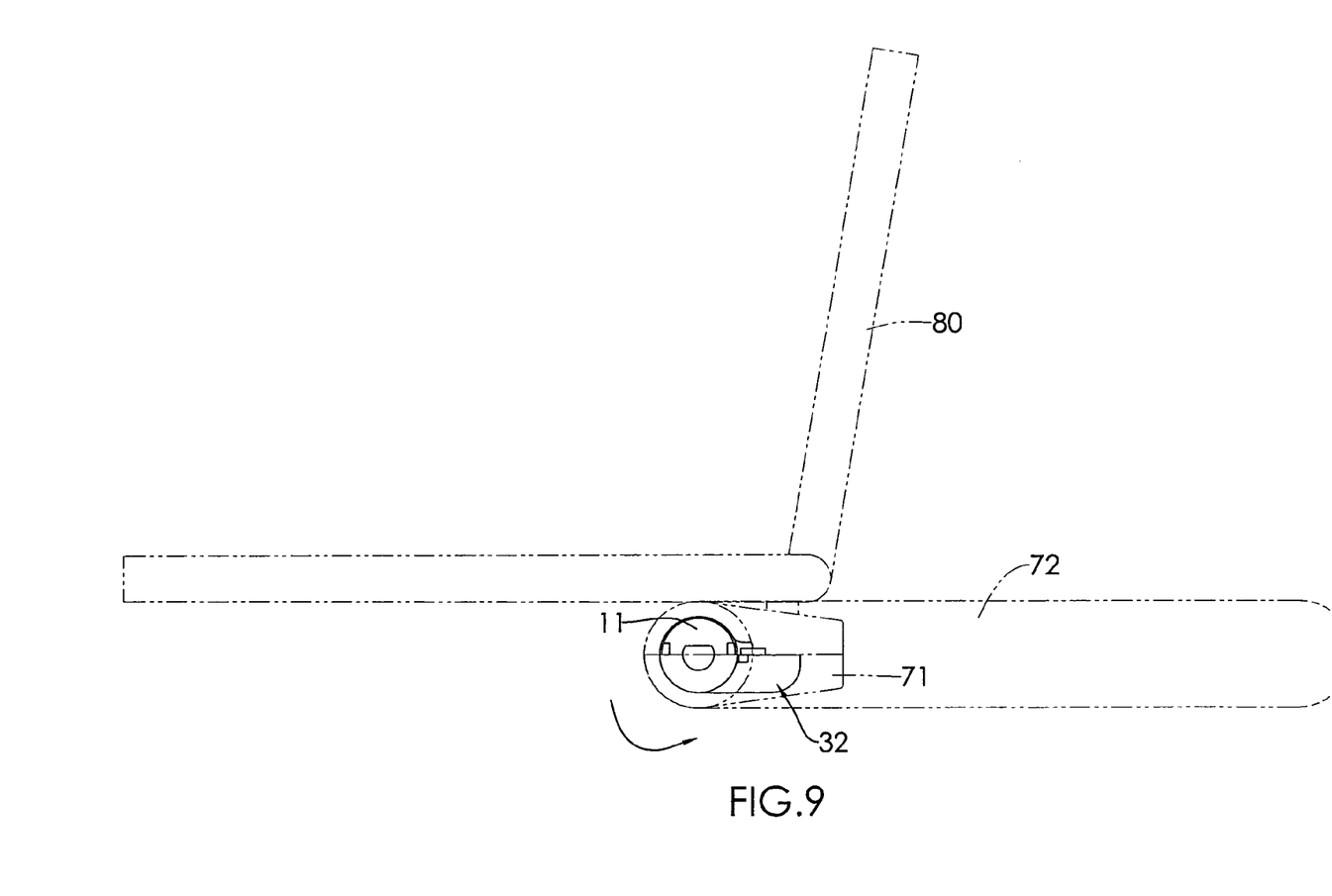
FIG. 9 is an operational side view of the hinge in FIG. 1 applied in an extension pad when the pad is limited in rotating angle.

With further reference to FIGS. 5 and 9, the limiting disk (40) is mounted coaxially securely around the shaft (12), is adjacent to the inner surface (301) of the limiting stationary leaf (30) and has an inner surface (401), an edge (403), a keyed hole (402) and a limit (41).

The keyed hole is formed coaxially through the limiting disk (40) and corresponds to and is mounted around the shaft (12).

The limit (41) may be an arc limit, is formed radially on and protrudes from the edge (403) of the limiting disk (40), corresponds to the boss (33) and selectively abuts the boss (33) when rotating to restrict rotation of the pad (72) relative to the mounting segment (71).

The pressing assembly (50) is mounted coaxially around the distal end of the shaft (12), is adjacent to the inner surface (401) of the limiting disk (40), presses and thereby holds the limiting disk (40), positioning disk (20) and the limiting stationary leaf (30) together and provides friction against movement of the hinge and may comprise two keyed washers (51), at least one resilient spacer (52) and a nut (53).

The keyed washers (51) are coaxially mounted securely around the shaft (12), one of the keyed washers (51) presses the limiting disk (40) and each keyed washer has a keyed hole (512). The keyed hole (512) is formed coaxially through the keyed washer (51) and corresponds to and is mounted around the shaft (12).

The at least one resilient spacer (52) is rotatably mounted coaxially around the shaft (12) between the two keyed washers (51) to provide a pressing force and each resilient spacer (52) has a pivoting hole (522). The pivoting hole (522) is round, is formed coaxially through the resilient spacer (52) and is mounted around the shaft (12).

The nut (53) is mounted securely around the threaded segment (121) of the shaft and abuts one of the keyed washers (51).

Figure 7:
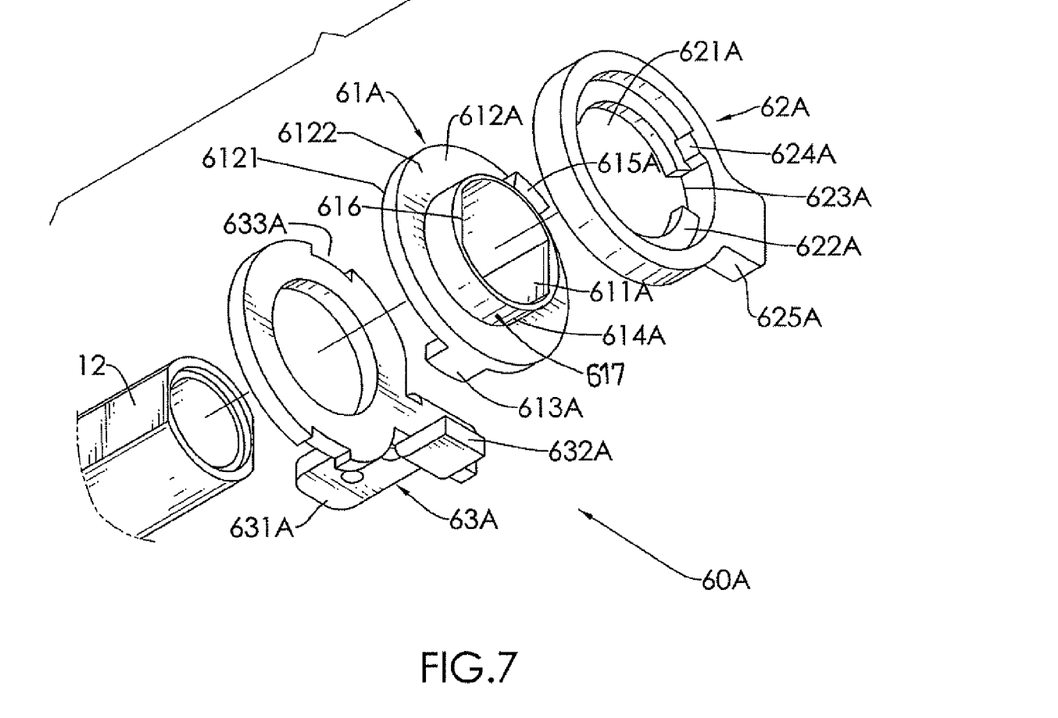
FIG. 7 is an exploded perspective view of another embodiment of the locking assembly in the hinge in FIG. 1.

With further reference to FIG. 7, the locking assembly (60, 60A) is mounted around the distal end of the shaft (12), is adjacent to the pressing assembly (50) and has a sliding lock (61, 61A), a lock ring (62, 62A) and a locking stationary leaf (63, 63A).

The sliding lock (61, 61A) is movably mounted coaxially around the distal end of the shaft (12) and has an outside wall (617), an inner surface (616), an outer surface (610), a through hole (611, 611A), a flange (612, 612A), a positioning stopper (613, 613A), a mounting segment (614, 614A) and may have at least one mounting protrusion (615, 615A).

The outside wall (617) of the sliding lock (61, 61A) is circular in cross section.

The through hole (611, 611A) is keyed corresponding to the shaft, is formed coaxially through the sliding lock (61, 61A) and is mounted slidably around the distal end of the shaft (12).

The flange (612, 612A) is formed radially around and extends from the outside wall (617) of the sliding lock (61, 61A) at the outer surface (610) and has an inner surface (6122) and an outer surface (6121).

The positioning stopper (613, 613A) is formed on and protrudes from the flange (612, 612A) and may protrude from the inner surface (6122) or the outer surface (6121) of the flange (612, 612A).

The mounting segment (614, 614A) is formed on and protrudes from the inner surface (616) of the sliding lock (61, 61A) and has an annular end edge (6141).

In a first embodiment, the positioning stopper (613) protrudes from the inner surface (6122) of the flange (612) and adjacent to the outside wall (617) of the sliding lock (61).

In a second embodiment, the positioning stopper (613A) extends from the outer surface (610) of the flange (612A).

The mounting protrusion (615, 615A) protrudes radially from the mounting segment (614, 614A) and is adjacent to the annular end edge (6141) of the mounting segment (614, 614A).

The lock ring (62, 62A) is rotatably mounted coaxially around the sliding lock (61, 61A), may be rotatably mounted coaxially around the mounting segment (614, 614A), is connected to the lock (73) and allows a user to move the lock ring (62, 62A) to move the sliding lock (61) to lock the hinge and has an edge (620), a rotating hole (621, 621A), may have a lip (622, 622A), may have at least one inserting notch (623, 623A), may have a stopping protrusion (624, 624A) and has a handle (625, 625A).

The rotating hole (621, 621A) is formed coaxially through the lock ring (62, 62A), is mounted around the sliding lock (61, 61A), may be mounted around the mounting segment (614, 614A) and has an inner wall (6210).

The lip (622, 622A) is formed around the inner wall (6210) of the rotating hole (621, 621A), corresponds to the mounting protrusion (615, 615A) and has an outer surface (6220). The outer surface (6220) of the lip (622, 622A) abuts the mounting protrusion (615, 615A) to prevent the lock ring (62, 62A) from detaching from the sliding lock (61, 61A).

The at least one inserting notch (623, 623A) is formed on the lip (622, 622A), corresponds to the at least one mounting protrusion (615, 615A) to allow the at least one mounting protrusion (615, 615A) to pass through during manufacture.

The stopping protrusion (624, 624A) is formed on the inner wall (6210) of the rotating hole (621, 621A), is adjacent to the lip (622, 622A), corresponds to the at least one mounting protrusion (615, 615A) and selectively abuts the mounting protrusion (615, 615A) to prevent the mounting protrusion (615, 615A) aligning with and sliding out of the inserting notch (623, 623A).

The handle (625, 625A) is formed radially on and protrudes from the edge (620) of the lock ring (62, 62A) and connects with the lock (73).

The locking stationary leaf (63, 63A) is mounted rotatably around the shaft (12), connects securely to the limiting stationary leaf (30) and has an edge (630), a pivoting hole (634), a limiting mounting protrusion (631, 631A), a retaining bar (632, 632A) and at least one limiting detent (633, 633A).

In the first embodiment, the locking stationary leaf (63) may be mounted rotatably around the sliding lock (61).

In the second embodiment, the locking stationary leaf (63A) may be adjacent to the outer surface (610) of the sliding lock (61A).

The pivoting hole (634) is round and formed through the locking stationary leaf (63, 63A), is mounted around the shaft (12) and may be mounted around the sliding lock (61).

The limiting mounting protrusion (631, 631A) is formed radially on the edge (630) of the locking stationary leaf (63, 63A) and protrudes transversely toward and attaches to the mounting protrusion (32) of the stationary leaf (30) to connect the limiting stationary leaf (30) and the locking stationary leaf (63, 63A) together.

The retaining bar (632, 632A) is formed on the limiting mounting protrusion (631, 631A) and protrudes transversely away from the mounting protrusion (32) of the limiting stationary leaf (30), corresponds to and selectively abuts the handle (625, 625A), when the handle (625, 625A) rotates to prevent the at least one mounting protrusion (615, 615A) from aligning with and sliding out of the at least one inserting notch (623, 623A).

Figure 6:
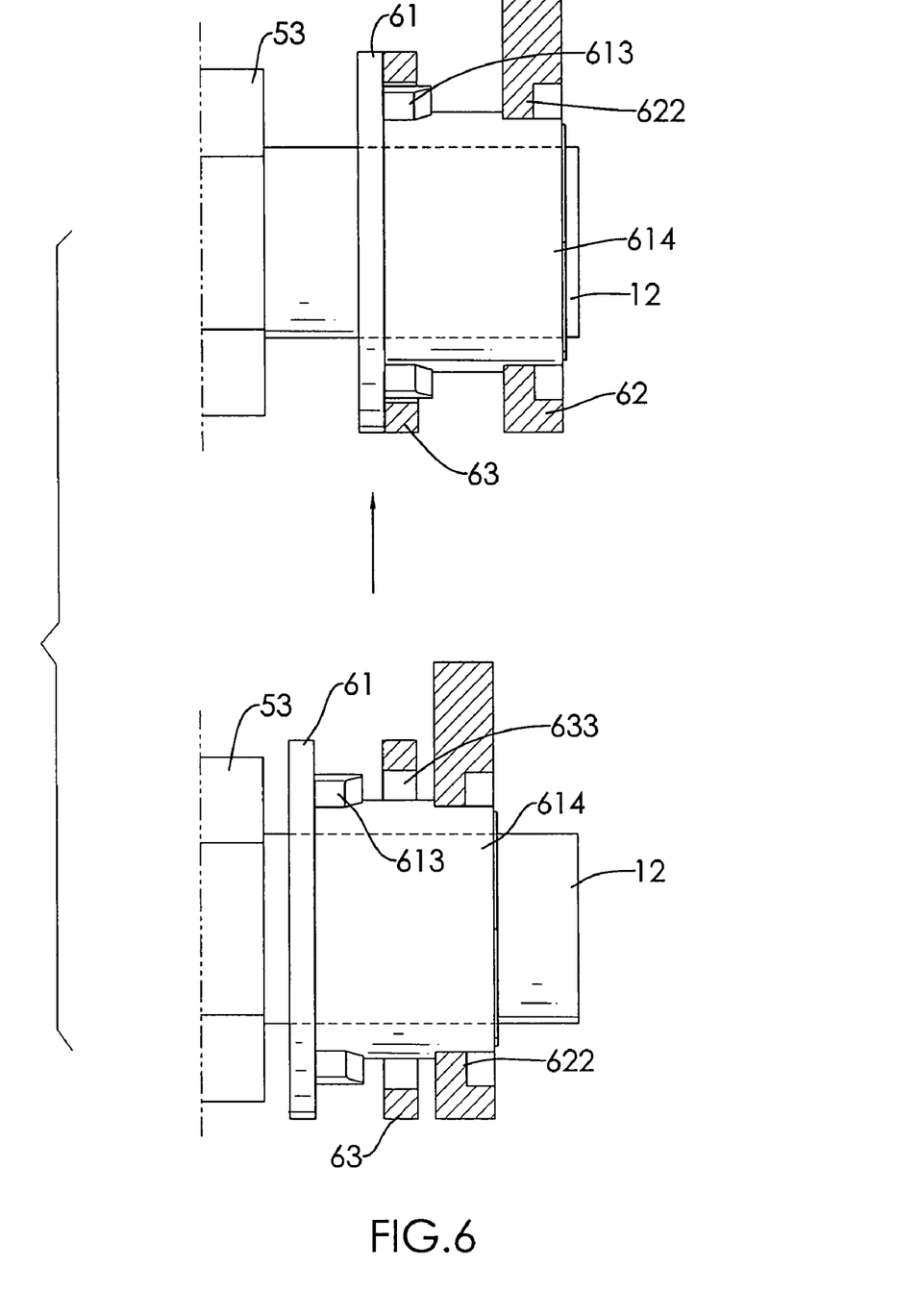
FIG. 6 is an operational front view in partial section of the hinge in FIG. 1 with the sliding lock moving toward then engaging with the locking stationary leaf.
Figure 10:
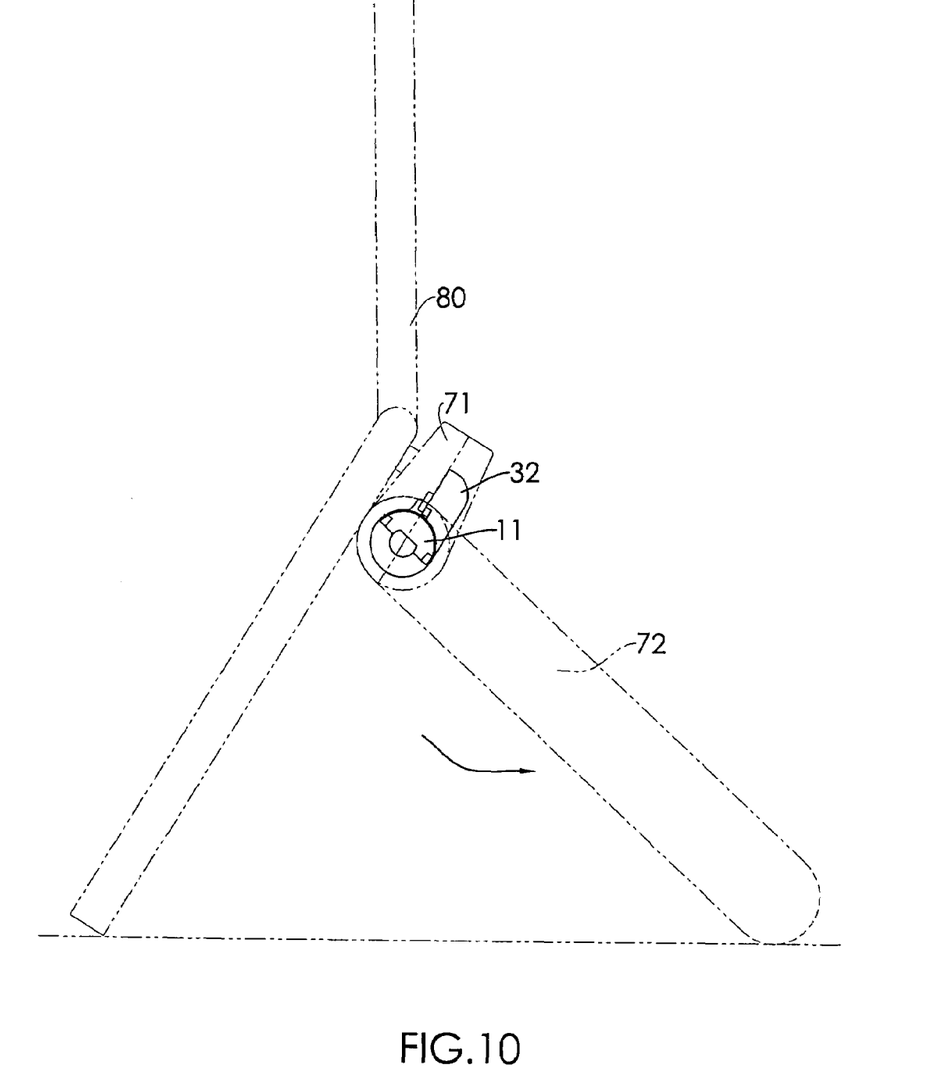
FIG. 10 is an operational side view of the hinge in FIG. 1 applied in an extension pad when the pad is held in a designed position to provide the notebook an preferred operating angle.

With further reference to the FIGS. 6 and 10, the at least one locking detent (633, 633A) is formed in the locking stationary leaf (63, 63A), corresponds to the at least one positioning stopper (613, 613A) and selectively engages the positioning stopper (613, 613A) when the user slides the lock (73) to move the sliding lock (61, 61A) toward the locking stationary leaf (61, 61A). The locking detent (633, 633A) may be formed in the pivoting hole (634) of the locking stationary leaf (63) or may be formed in the edge (630) of the locking stationary leaf (63A).

Consequently, the hinge securely holds the pad (72) in a designed position to provide an operating angle by engaging the at least one positioning stopper (613, 613A) with the locking detent (633, 633A).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge for a notebook extension pad comprising
   a pivoting assembly having
      an inner end;
      an outer end;
      a mounting leaf being formed on and extending from the outer end of the pivoting assembly; and
      a shaft being keyed, being formed on and extending from the inner end of the pivoting assembly and having a distal end;
   a positioning disk being mounted coaxially and securely around the shaft and having
      an inner surface;
      a keyed hole being formed through the positioning disk and corresponding to and engaging the shaft; and
      at least one positioning protrusion being formed on and protruding from the inner surface of the positioning disk;
   a limiting stationary leaf being rotatably mounted coaxially around the shaft, being adjacent to the inner surface of the positioning disk and having
      an edge;
      an inner surface;
      a pivoting hole being round, being formed coaxially through the limiting stationary leaf and being mounted around the shaft;
      multiple detents being formed separately in edge of the limiting stationary leaf and corresponding respectively to and selectively engaging the positioning protrusion;
      a mounting protrusion being formed on and extending from the edge of the limiting stationary leaf; and
      a boss being formed on and protruding from the inner surface of the limiting stationary leaf;
   a limiting disk being mounted coaxially securely around the shaft, being adjacent to the inner surface of the limiting stationary leaf and having
      an inner surface;
      an edge;
      a keyed hole being formed coaxially through the limiting disk and corresponding to and being mounted around the shaft; and
      a limit being formed radially on and protruding from the edge of the limiting disk, corresponding to and selectively abutting the boss;
   a pressing assembly being mounted coaxially around the distal end of the shaft, being adjacent to the inner surface of the limiting disk and pressing the limiting disk; and
   a locking assembly being mounted around the distal end of the shaft being adjacent to the pressing assembly and having
      a sliding lock being movably mounted coaxially around the distal end of the shaft and having
         an outside wall being circular in cross section;
         an inner surface;
         an outer surface;
         a through hole being keyed corresponding to the shaft, being formed coaxially through the sliding lock and being mounted slidably around the distal end of the shaft;
         a flange being formed radially around and extending from the outside wall of the sliding lock at the outer surface and having an inner surface and an outer surface;
         a positioning stopper being formed on an protruding from the flange;
         a mounting segment being formed on and protruding from the inner surface of the sliding lock and having an annular end edge; and
         at least one mounting protrusion protruding radially from the mounting segment and being adjacent to the annular end edge of the mounting segment;
      a lock ring being rotatably mounted coaxially around the mounting segment and having
         an edge;
         a rotating hole being formed coaxially through the lock ring and having an inner wall; and
         a handle being formed radially on and protruding from the edge of the lock ring; and
      a locking stationary leaf being mounted rotatably around the shaft, securely to the mounting protrusion of the limiting stationary leaf and having
         an edge;
         a pivoting hole being round and formed through the locking stationary leaf;
         a limiting mounting protrusion being formed radially on the edge of the locking stationary leaf and protruding transversely toward and attaching to the mounting protrusion of the limiting stationary leaf;
         a retaining bar being formed on the limiting mounting protrusion, and protruding transversely away from the mounting protrusion of the limiting stationary leaf, corresponding to and selectively abutting the handle and selectively reaching to the handle; and
         at least one locking detent being formed in the locking stationary leaf, corresponding to the at least one positioning stopper and selectively engaging the positioning stopper.

2. The hinge as claimed in claim 1, wherein the shaft of the pivoting assembly further has a threaded segment; and
   the pressing assembly further comprises
      two keyed washers being coaxially mounted securely around the shaft, one of the keyed washers pressing the limiting disk and each keyed washer having a keyed hole being formed coaxially through the keyed washer and corresponding to and being mounted around the shaft;
      at least one resilient spacer being rotatably mounted coaxially around the shaft between the two keyed washers and each resilient spacer having a pivoting hole being round, being formed coaxially through the resilient spacer and being mounted around the shaft; and a nut being mounted securely around the threaded segment of the shaft and abutting the other one of the keyed washers.

3. The hinge as claimed in claim 1, wherein each positioning protrusion of the positioning disk is convex.

4. The hinge as claimed in claim 1, wherein the lock ring further has a lip being formed around the inner wall of the rotating hole, corresponding to the mounting protrusion and having an outer surface;

at least one inserting notch being formed on the lip and corresponding to the at least one mounting protrusion; and a stopping protrusion being formed on the inner wall of the rotating hole, being adjacent to the lip, corresponding to the mounting protrusion and selectively abutting the mounting protrusion.

5. The hinge as claimed in claim 1, wherein the positioning stopper of the sliding lock protrudes from the outer surface of the flange and adjacent to the outside wall of the sliding lock; and the locking stationary leaf is mounted rotatably around the outer surface of the sliding lock.

6. The hinge as claimed in claim 1, wherein the positioning stopper of the sliding lock extends from the inner surface of the flange; and the locking stationary leaf is adjacent to the inner surface of the sliding lock.

7. The hinge as claimed in claim 1, wherein the limit of the limiting disk is an arc limit.

* * * * *